United States Patent
Kou et al.

(10) Patent No.: US 10,658,096 B2
(45) Date of Patent: May 19, 2020

(54) MAGNETIC MULTILAYER SHEET

(71) Applicant: 3M INNOVATIVE PROPERTIES COMPANY, St. Paul, MN (US)

(72) Inventors: Xiaoming Kou, Woodbury, MN (US); Michael S. Graff, Woodbury, MN (US); Jeffrey M. Florczak, Granite Shoals, TX (US); Steven L. Johnson, Brownwood, TX (US); Rui Yang, Austin, TX (US); Carlos A. Barrios, Woodbury, MN (US); Steven D. Theiss, Woodbury, MN (US); Kevin W. Gotrik, Hudson, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 16/077,496

(22) PCT Filed: Feb. 9, 2017

(86) PCT No.: PCT/US2017/017136
§ 371 (c)(1),
(2) Date: Aug. 13, 2018

(87) PCT Pub. No.: WO2017/151285
PCT Pub. Date: Sep. 8, 2017

(65) Prior Publication Data
US 2019/0035523 A1    Jan. 31, 2019

Related U.S. Application Data

(60) Provisional application No. 62/378,930, filed on Aug. 24, 2016, provisional application No. 62/303,567, filed on Mar. 4, 2016.

(51) Int. Cl.
*B32B 7/025* (2019.01)
*H01F 1/147* (2006.01)
(Continued)

(52) U.S. Cl.
CPC ............... *H01F 1/147* (2013.01); *B32B 7/02* (2013.01); *B32B 7/12* (2013.01); *B32B 9/04* (2013.01);
(Continued)

(58) Field of Classification Search
CPC ... H01F 1/14; H01F 1/147; H01F 1/16; H01F 3/02; B32B 7/02; B32B 7/025;
(Continued)

(56) References Cited

U.S. PATENT DOCUMENTS

| 4,842,893 A | 7/1989 | Yializis |
| 6,045,864 A | 4/2000 | Lyons |

(Continued)

FOREIGN PATENT DOCUMENTS

WO    WO 2014/055118    4/2014

OTHER PUBLICATIONS

Magnetic Properties of Ferromagnetic Materials. Obtained from hyperphysics.phy-astr.gsu.edu on Mar. 7, 2019.*

(Continued)

*Primary Examiner* — Megha M Gaitonde
(74) *Attorney, Agent, or Firm* — Janet A. Kling (57) ABSTRACT

A multilayer magnetic sheet is described which comprises a plurality of stacked magnetic component layers separated by first electrically insulating layers. Each of the plurality of magnetic component layers comprises a plurality of isolated magnetic sublayers having a magnetic layer thickness of less than one micron. The multilayer magnetic sheet has a magnetic fraction between about 5% and about 80%; a total magnetic thickness of greater than or equal to 5 microns; and a relative composite permeability of greater than about 20.

17 Claims, 3 Drawing Sheets

(51) Int. Cl.
| | |
|---|---|
| *B32B 9/04* | (2006.01) |
| *B32B 15/08* | (2006.01) |
| *B32B 7/02* | (2019.01) |
| *B32B 27/28* | (2006.01) |
| *B32B 27/32* | (2006.01) |
| *B32B 27/36* | (2006.01) |
| *B32B 7/12* | (2006.01) |
| *B32B 27/08* | (2006.01) |
| *H01F 3/02* | (2006.01) |

(52) U.S. Cl.
CPC ............. *B32B 15/08* (2013.01); *B32B 27/08* (2013.01); *B32B 27/281* (2013.01); *B32B 27/32* (2013.01); *B32B 27/36* (2013.01); *H01F 3/02* (2013.01); *B32B 2250/05* (2013.01); *B32B 2250/24* (2013.01); *B32B 2255/10* (2013.01); *B32B 2255/20* (2013.01); *B32B 2255/205* (2013.01); *B32B 2255/28* (2013.01); *B32B 2307/20* (2013.01); *B32B 2307/206* (2013.01); *B32B 2307/208* (2013.01); *B32B 2307/732* (2013.01); *B32B 2457/00* (2013.01); *B32B 2457/08* (2013.01); *B32B 2519/02* (2013.01)

(58) Field of Classification Search
CPC .... B32B 7/12; B32B 7/14; B32B 9/04; B32B 9/041; B32B 15/08; B32B 15/013; B32B 15/04; B32B 27/04; B32B 27/06; B32B 27/08; B32B 27/281; B32B 27/32; B32B 27/36; B32B 2250/05; B32B 2255/10; B32B 2255/20; B32B 2255/205; B32B 2255/28; B32B 2307/20; B32B 2307/206; B32B 2307/208; B32B 2307/732; B32B 2457/00; B32B 2457/08; B32B 2519/02; Y10T 428/24942; Y10T 428/2495; Y10T 428/24959; Y10T 428/24967

USPC .......................... 428/212, 213, 214, 215, 220
See application file for complete search history.

(56) References Cited

U.S. PATENT DOCUMENTS

| | | |
|---|---|---|
| 7,803,470 B2 | 9/2010 | Ikeda |
| 2004/0058138 A1 | 3/2004 | Inazawa |
| 2004/0219328 A1 | 11/2004 | Kazunori et al. |
| 2006/0068228 A1 | 3/2006 | Ikeda |
| 2008/0075975 A1 | 3/2008 | Glaser |
| 2009/0017279 A1* | 1/2009 | Mizushima ............... H01F 1/26 428/220 |
| 2009/0040126 A1 | 2/2009 | Inoue |
| 2011/0081502 A1 | 4/2011 | Bright |
| 2015/0171157 A1 | 6/2015 | Sturcken |
| 2015/0214405 A1 | 6/2015 | Nachtigal |
| 2015/0213990 A1 | 7/2015 | Spagnola |
| 2015/0221886 A1 | 8/2015 | Klun |

OTHER PUBLICATIONS

Li, "High-Frequency Resistivity of Soft Magnetic Granular Films", IEEE Transactions of Magnetics, Oct. 2005, vol. 41, No. 10, pp. 3283-3285.

Mu, "New core loss measurement method for high-frequency magnetic materials", IEEE Transactions on Power Electronics, Aug. 2014, vol. 29, No. 8, pp. 4374-4381.

Su, "High Frequency Integrated Point of Load (POL) Module with PCB Embedded Inductor Substrate", IEEE Energy Conversion Congress and Exposition, Sep. 2013, pp. 1243-1250.

International Search Report for PCT International Application No. PCT/US2017/017136, dated May 19, 2017, 3 pages.

Search Report for CN Application No. 201780015010.4, dated Sep. 12, 2019, 1 pg.

* cited by examiner

MAGNETIC MULTILAYER SHEET

BACKGROUND OF THE INVENTION

Field of the Invention

The present invention generally relates to a low core loss density magnetic material. The inventive material comprises a dual level magnetic laminate having a plurality of thin isolated magnetic sublayers.

Background

Magnetic cores are key components in inductors or transformers used in electrical circuits. In electronics, a point of load (POL) DC/DC converter converts a higher DC voltage to a lower DC voltage. Modern microprocessors require a precise power supply at low voltage and high current. POL converters are positioned near the microprocessors to eliminate long wire lengths between the power source and the load (i.e. the microprocessor). For example, in a laptop computer, the power adapter is plugged into the wall outlet and converts 110 V AC to about 19 V DC. The POL is located near the central processing unit CPU on motherboard and converts the 19 V DC to a DC voltage typically below 1.5 V to power the CPU.

Power transistors, power inductors, and capacitors are key components in POL converters. Conventional inductors are typically bulky and can be a bottle neck in the constant demand of miniaturization in powered electronics. Two strategies can be applied to reduce inductor foot print: (1) the size of the inductor can be reduced by increasing inductor working frequency. The function of an inductor in circuit depends on its impedance, which is proportional to the product of working frequency and inductance. For a required impedance, the higher the frequency, the lower the inductance needed. Thus a smaller inductor can be used thus the smaller the inductor size. (2) Package level integration can be reduced by embedding the inductor into printed circuit board (PCB) which reduces the footprint that the converter utilizes on the surface of the PCB.

In recent years, the emergence of high speed and high power SiC and GaN transistors makes it possible to reduce POL converter size by increasing working frequency, especially for medium and high power applications.

Conventional amorphous and nanocrystalline ribbons are too lossy in the MHz range due to their thickness (generally around about 18 μm) and their low resistivity, both of which can promote eddy current losses. Although studies have demonstrated moderate core loss reduction with thinner ribbons, the thinning processes, such as melt-spinning in vacuum, chemical etching, and cold rolling, are expensive and difficult to be implemented in mass production. Crystalized thin (~3 μm) metal ribbons (e.g. made of iron-nickel/FeNi) also show only a moderate reduction in core loss density at a high manufacturing cost.

As an alternative, bulk power ferrites (e.g. nickel zinc ferrites such as 4F1 available from Ferroxcube America (Gilbert, Ariz.)) are widely adopted in the MHz frequency range but can have issues of size, low saturation magnetization, susceptibility to fracture and high synthesis temperature that impede their integration with semiconductor electronic devices.

State of the art integral magnetic core materials for power inductors for use in medium to high power POL converters include low temperature co-fired ceramic (LTCC) ferrite and magnetic flake composites. Even with these materials, obtaining a material with low core loss in the megahertz frequency range is challenging. (See FIG. 3 from Y. Su, et. al, "High Frequency Integrated Point of Load (POL) Module with PCB Embedded Inductor Substrate", *Energy Conversion Congress and Exposition (ECCE)*, 2013 IEEE, p 1243). The LTCC ferrite is made by sintering and pressing a lamination of green tapes, which are composed of NiZn ferrite particles disposed in a binder. This material has the lowest core loss density at frequency above 2 MHz (e.g. a core loss density of about 1100 kW/m$^3$ at 3 MHz at an excitation of 20 mT). In comparison, SENFOLIAGE (SF) alloy flake composite developed by NEC Tokin (Japan) has the lowest core loss density below 2 MHz and a core loss density of about 1150 kW/m$^3$ at 3 MHz at an excitation of 20 mT. The SF alloy composite is made from iron (Fe) based magnetic flakes by pressing and sintering.

While magnetic films with attractive magnetic properties up to even GHz frequency range have been demonstrated, they are relatively thin. Often real world applications require thicker materials than have been achieved at this performance level to date. For example, inductor core materials for medium to high power POL converters often require thicknesses of the magnetic material to be up to a millimeter thick, which can be difficult to make due to cracking, wrinkling, and/or delamination during deposition to form thicker film.

Thus, there is a need for magnetic core materials with low core loss densities, high saturation magnetization, large permeability, integration compatibility, and working frequencies above 1 MHz.

SUMMARY

In one embodiment, the present description relates to a sheet of magnetic material having a multilayer structure. The multilayer structure comprises a plurality of stacked magnetic component layers separated by first electrically insulating layers, wherein each of the plurality of magnetic component layers comprises a plurality of isolated magnetic sublayers. Each of the magnetic sublayers has a magnetic layer thickness of less than one micron. The magnetic material has a magnetic fraction between about 5% and about 80%, a total magnetic thickness of greater than or equal to 5 microns, and a relative composite permeability of greater than about 20.

In one aspect, each of the isolated magnetic sublayers comprises at least one of a single magnetic metal element, a magnetic alloy, or a magnetic nano-granular film.

The exemplary magnetic material can further include an inorganic insulating layer disposed between each of the isolated magnetic sublayers. The inorganic insulating layer is one of an inorganic oxide layer, an inorganic fluoride layer, and inorganic nitride layer.

The above summary of the present invention is not intended to describe each illustrated embodiment or every implementation of the present invention. The figures and the detailed description that follows more particularly exemplify these embodiments.

BRIEF DESCRIPTION OF THE DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

In the following detailed description of the preferred embodiments, reference is made to the accompanying drawings, which illustrate specific embodiments in which the invention may be practiced. The illustrated embodiments are not intended to be exhaustive of all embodiments according to the invention. It is to be understood that other embodiments may be utilized and structural or logical changes may be made without departing from the scope of the present invention. The following detailed description, therefore, is not to be taken in a limiting sense, and the scope of the present invention is defined by the appended claims.

A low core loss density magnetic material is described herein. The inventive material comprises a dual level magnetic laminate having a plurality of thin isolated magnetic sublayers. A dual level magnetic laminate is a structure having a plurality of tiers comprising a magnetic portion and a nonmagnetic insulating portion wherein each magnetic portion includes a plurality of thin isolated magnetic sublayers.

This magnetic laminate can be used as inductor core material suitable for Point-of-Load (POL) DC/DC converter applications with working frequency in MHz range. Additional applications include wireless power charging applications, near field communication/radio frequency identification (RFID) applications, electromagnetic interference (EMI)/electromagnetic compatibility (EMC) control applications or other power electronics applications. Comparing to conventional magnetic materials, the exemplary material described herein has lower core loss, higher permeability, flexibility and is compatible with a printed circuit board (PCB) integration process. Note: the terms "permeability" and relative permeability are considered analogous in the present disclosure unless otherwise noted.

To be compatible with a PCB board integration process, the exemplary material needs to be available in a planar sheet format and should be thin enough to be handled in conventional PCB lamination processes. In one aspect of the invention, the exemplary magnetic material is thick enough to satisfy the requirements for use in medium to high converter applications while still being thin enough to be compatible with standard PCB integration processes.

Figure 1:
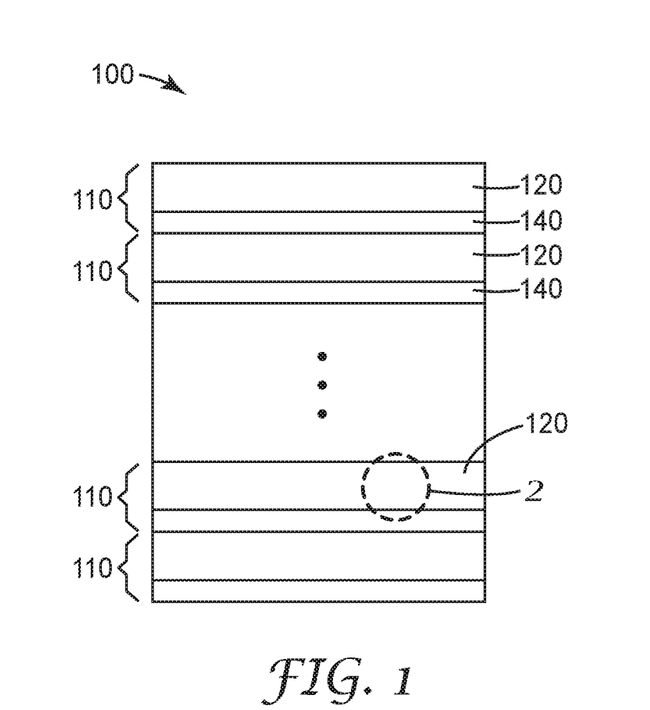
FIG. 1 is a schematic representation of an exemplary magnetic material of the present invention.

In a first embodiment shown in FIG. 1, the exemplary magnetic material 100 has a planar multi-tier multilayer structure that is composed of a plurality of multilayer subunits or tiers 110 that have been laminated together to form an integral material. Each of the multilayer subunits represent a tier in the final construction. Each tier comprises a magnetic component layer 120 and a first electrically insulating layer 140 such that when the magnetic material is formed it has a plurality of stacked magnetic component layers separated by first electrically insulating layers. The number of tiers in the final laminate can be represented as m, wherein the magnetic material has between about 10 tiers and about 5000 tiers or ($10 \leq m \leq 5000$).

The overall thickness, T, of the exemplary material is equal to the thickness of a single tier (the sum of the magnetic component layer thickness, $t_{mc}$, plus the first insulating layer thickness, $t_i$,) multiplied by the number of tiers or:

$$T = m(t_{mc} + t_i)$$

The overall thickness of the exemplary material can be from about 10 microns to about 5 mm, preferably from about 100 microns to about 2 mm. The magnetic component layer thickness can be from about 0.5 microns to about 5 microns, preferably from about 1 micron to about 3 microns. Above 5 microns, the magnetic component can crack and delaminate, while below 0.5 microns the magnetic component layer may not have sufficient magnetic strength.

The first insulating layer should be as thin as possible so that the magnetic content is as high as possible. Thus, in an exemplary aspect, the first insulating layer will have a first insulating layer thickness of less than 25 microns. In another exemplary aspect, the first insulating layer will have a first insulating layer thickness between about 0.5 microns and 20 microns, preferably between about 0.5 microns and 10 microns, most preferably between about 0.5 microns and 5 microns.

Each of the plurality of magnetic component layers 120 is made up of a plurality of isolated magnetic sublayers 125, wherein each of the magnetic sublayers has a magnetic layer thickness less than one micron. A second insulating layer or inorganic insulating sublayer 130 is disposed between each of the isolated magnetic sublayers. The magnetic component layer can be formed on the first insulating layer by a conventional vapor deposition process. Specifically, thin alternating layers of the magnetic material and inorganic insulating material can be vapor deposited on the first insulating layer. One isolated magnetic sublayer and one inorganic insulating sublayer make up a sublayer pair 122 (see FIG. 2). There are n sublayer pairs in the magnetic component layer wherein n is between 2 and about 50, preferably between about 10 and about 30.

Figure 2:
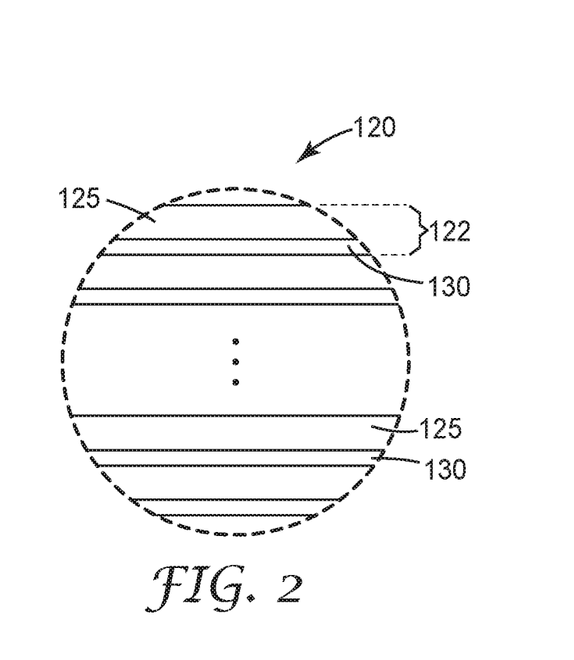
FIG. 2 is a schematic detail view of a magnetic component layer of the exemplary magnetic material of FIG. 1.

Each of the isolated magnetic sublayers 125 can be made of a magnetic material comprising a single magnetic metal element, a magnetic alloy, or a magnetic nano-granular film. The magnetic material can be in crystallized state or amorphous state. Each of the isolated magnetic sublayers 125 can have magnetic layer thickness, $t_{ms}$, wherein $t_{ms}$ is between 15 nm and about 1000 nm. The desire for low loss at high frequencies drives the need for thin electrically insulated magnetic sublayers. Keeping the isolated magnetic layers thin can lead to an improvement in core loss density as compared to materials having thicker magnetic material layers as well as reducing eddy currents in the resulting magnetic material.

Exemplary single magnetic metal elements can include, but not limited to, iron (Fe), nickel (Ni), cobalt (Co), etc. Exemplary magnetic alloys include nickel-cobalt alloys, permalloy (an alloy of nickel and iron) such as $Ni_{80}Fe_{20}$, iron-cobalt alloys such as $Fe_{65}Co_{35}$, magnetic cobalt-niobium alloys such as $Co_{83}Nb_{17}$, iron-cobalt-nickel alloys such as $Fe_{54}Ni_{29}Co_{17}$, and iron-cobalt-boron alloys such as $Fe_{40}Co_{40}B_{20}$.

Exemplary materials for inorganic insulating layer 130 include inorganic oxides such as silicon dioxide ($SiO_2$), silicon monoxide (SiO), zirconium oxide ($ZrO_2$), aluminum oxide ($Al_2O_3$), hafnium (IV) oxide ($HfO_2$), zinc oxide (ZnO), boron trioxide ($B_2O_3$), and chromium (III) oxide ($Cr_2O_3$), inorganic fluoride such as magnesium fluoride ($MgF_2$), and inorganic nitrides such as silicon nitride ($Si_3N_4$).

In one aspect of the invention, it is desirable to have as much magnetic material in the final construction as possible. Thus, the amount of the inorganic insulating material can be minimized. The inorganic insulating layer 130 can have insulating sublayer thickness, $t_{is}$, wherein $t_{is}$ is less than about 200 nm; preferably between about 2 nm and about 200 nm.

An exemplary magnetic nano-granular film is made of nano-sized magnetic metal particles embedded in an insulating matrix. The insulating matrix can be an inorganic oxide or an organic material such as polytetrafluoroethylene (PTFE). The nanoparticles are close enough to one another to magnetically couple. The insulating matrix provides high resistivity for low loss penetration of microwave energy. Exemplary magnetic nano-granular films can have iron-cobalt particles in a silicon dioxide matrix (FeCo—$SiO_2$), iron-cobalt particles in a hafnium (IV) oxide matrix (FeCo—$HfO_2$), nickel-iron particles in a silicon dioxide matrix (NiFe—$SiO_2$), cobalt particles in a zirconium oxide matrix (Co—$ZrO_2$), or cobalt particles in an Aluminum oxide matrix (Co—$Al_2O_3$).

Exemplary materials for the first electrical insulating layer can be polymeric materials selected from, for example, the polyester (PET), polyimide (PI), Polyethylene naphthalate (PEN), polypropylene (PP), and polyethylene (PE) polymer families. In an exemplary aspect, the first electrical insulating layer material can be supplied in roll form on a carrier 150 (FIG. 3A) to facilitate the deposition of the magnetic component layer on to the surface of the first electrical insulating layer in a roll-to-roll coating process. In one aspect, the carrier should have a carrier thickness of less than about 75 microns.

Exemplary materials can include 1.4 µm thick PET substrate with a biaxially oriented polypropylene (BOPP) carrier available from Tekra (New Berlin, Wis.) and either 2.5 µm or 5 µm CP1 Polyimide on a 50 µm PET carrier available from NeXolve Corporation (Huntsville, Ala.).

Thus, the thickness of each magnetic component layer is:

$$t_{mc}=n(t_{ms}+t_{is})$$

where n is the number of isolated magnetic sublayers in each magnetic component layer.

The total magnetic thickness, $T_m$, of magnetic material 100 can be greater than or equal to 5 µm. The total magnetic thickness is the isolated magnetic sublayer thickness times the number of isolated magnetic sublayers in each magnetic component layer times the number of tiers in the magnetic material and can be calculated by:

$$T_m=(n \times m \times t_{ms}).$$

In an exemplary aspect, the magnetic content or fraction, $M_f$, of magnetic material 100 is between about 5% to about 80% of the final volume of the exemplary magnetic material and is a ratio of the total magnetic thickness to the total composite thickness that can be calculated by:

$$M_f=T_m/T \times 100.$$

Magnetic materials used in transformers and inductor cores are typically magnetically soft materials having low coercivity. Thus, in another aspect, magnetic material 100 can have a coercivity of less than 50 Oe.

In yet another aspect, the relative permeability of magnetic material 100, $\mu_{mm}$, should be greater than or equal to 20 and this can be approximated from the relative permeability of the material used in isolated magnetic sublayer, $\mu_{ms}$, by:

$$\mu_{mm}=\mu_{ms} \times M_f.$$

Figure 3A:
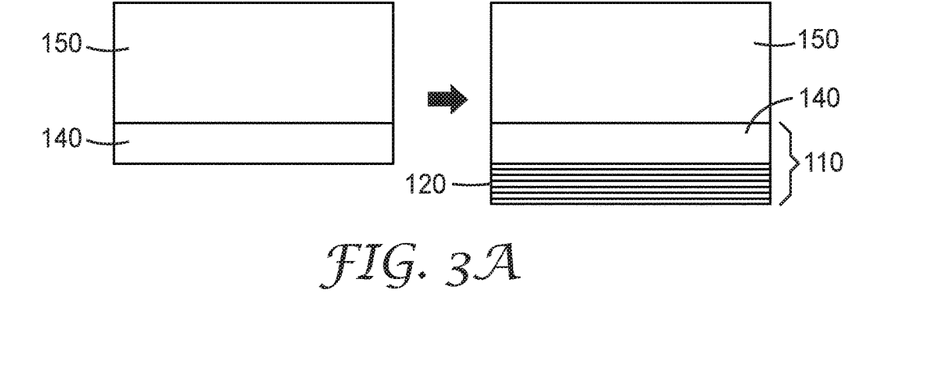
FIGS. 3A and 3B show an exemplary process for forming an exemplary magnetic material of the present invention.
Figure 3B:
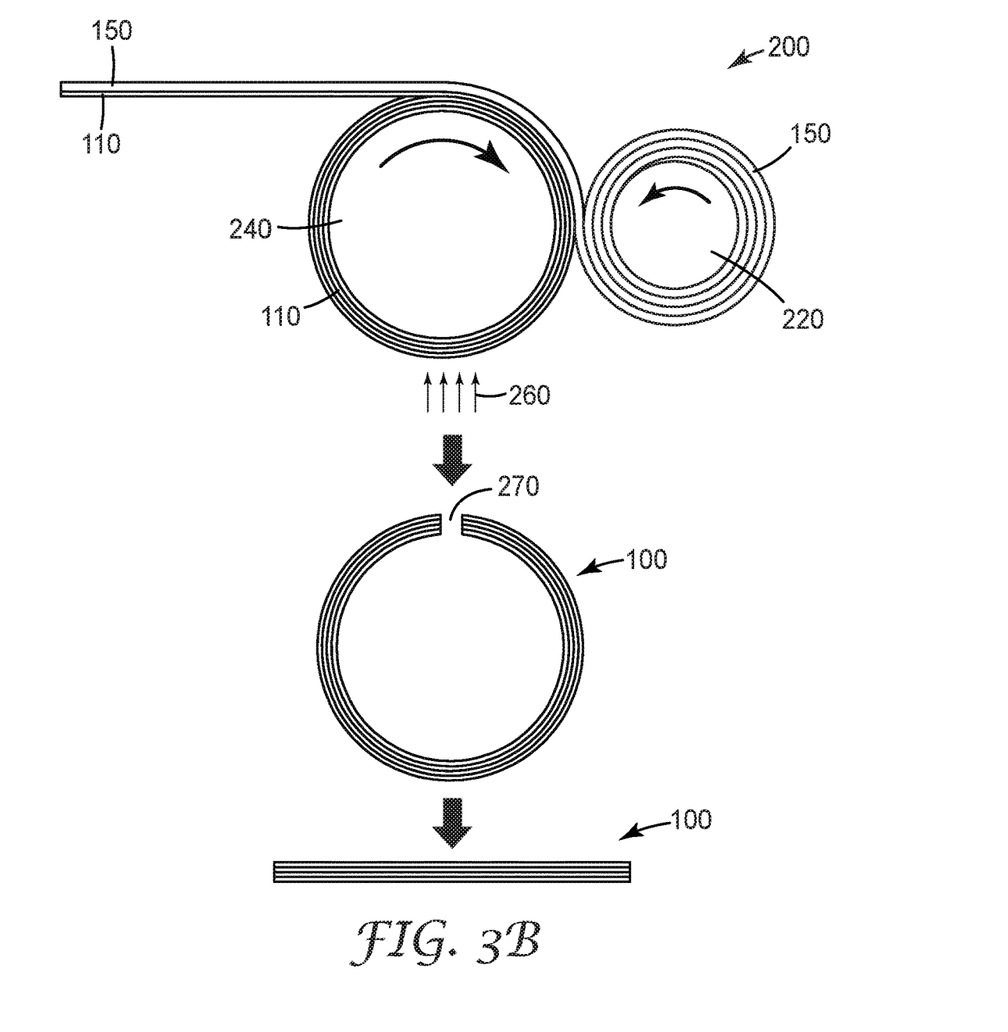

An exemplary process 200 for creating magnetic material 100 is illustrated in FIGS. 3A and 3B. These figures represent a batch wise continuous process for forming the exemplary magnetic material 100. The first step in the process is to create the multilayer subunit 110 by depositing the magnetic component layer 120 on top of the first insulating layer 140, where the first insulating layer is supported by a carrier 150 shown in FIG. 3A. The magnetic component layer comprising alternating layers of the magnetic material and inorganic insulating material can be vapor deposited using a conventional physical vapor deposition process such as an evaporative deposition process, a sputtering deposition process, or an ablation deposition process where the target is bombarded with a high energy beam (e.g. laser, high energy electrons or cathodic arc) which vaporizes the target material, which subsequently deposits on the work piece. The deposition chamber can be outfitted with two targets, one composed of the magnetic material and one composed of the inorganic insulating material allowing the alternating layers of magnetic material and inorganic insulating material to be formed continuously by simply changing the target being used in a given pass.

Once the multilayer subunit 110 has been built up to the desired number of layers of magnetic material, the roll of multilayer subunit supported on carrier 150 is removed from the deposition chamber. The multilayer subunit material can then be built into the exemplary magnetic material by lamination of a plurality of multilayer subunits together. This can be done in a piecewise sheet process or the laminate can be formed by a semi-continuous process 200 such as is shown in FIG. 3B.

Carrier 150 is stripped away from the multilayer subunit 110 to expose a surface of the first insulating layer and wrapped around a take-off drum 220 while the multilayer subunit is wrapped on a collection drum 240. After the carrier is removed, the exposed surface of the first insulating layer can be sprayed with a solvent 260 to tackify the surface of the first insulating layer. As the collection drum rotates, a new layer of the multilayer subunit will be disposed against the tackified surface with the tension on the collection drum providing the necessary pressure to laminate this new layer of the multilayer subunit to the previous layers already disposed on the drum.

Once the desired number of layers have been wound onto the collection drum, at least one cut 270 is made through the collected material which can then be removed from the collection drum. The collected material can then be laid flat to yield a sheet of exemplary magnetic material 100 that can be converted into the desired size and shapes for use in PCBs, inductor cores etc.

Exemplary tackifying solvents can be one of acetone, isobutylmethyl ketone (MIBK), methylethylketone (MEK), dimethylformamide (DMF), phenol, chlorophenol, nitrobenzene and dimethyl sulphoxide (DMSO), Tetrahydrofuran (THF), toluene, xylene, etc. depending on what the material is used for the first insulating layer. In an alternative aspect, a thin layer of spray on adhesive or transfer adhesive can be applied to the exposed surface of first insulating layer.

Figure 4:
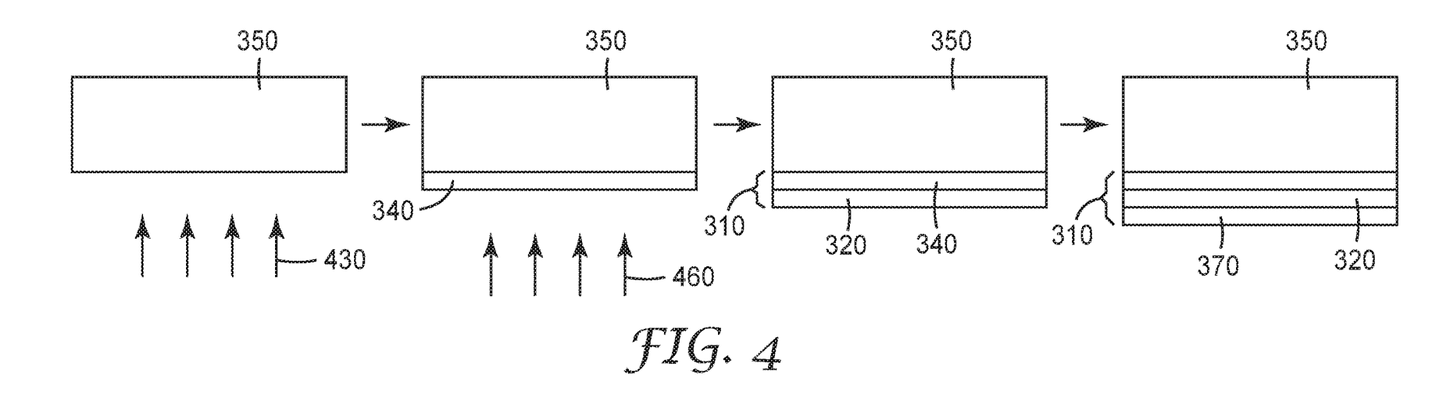
FIG. 4 shows another exemplary process 400 for creating the magnetic material of the current invention.

Another exemplary process for creating the magnetic material of the current invention is illustrated in FIG. 4. The first step in the process is to vapor deposit (represented by reference number 430 in FIG. 4) the first insulating layer 340 onto carrier 350 as described in U.S. Publ. No. 2015/0221886, incorporated herein by reference. Exemplary vapor coating processes for applying the first insulating layer include, for example, physical vapor deposition (PVD), chemical vapor deposition (CVD), and combinations thereof. The thickness of the vapor coated first insulating layer can be in the range of about 0.01 micron to about to 10 microns.

The deposited first insulating layer can be formed from various precursors, for example, (meth)acrylate (meth)acrylates or meth(meth)acrylates monomers and/or oligomers that include such as urethane(meth)acrylates, isobornyl (meth)acrylate, dipentaerythritol penta(meth)acrylates, epoxy(meth)acrylates, epoxy(meth)acrylates blended with styrene, di-trimethylolpropane tetra(meth)acrylates, diethylene glycol di(meth)acrylates, 1,3-butylene glycol di(meth)acrylate, penta(meth)acrylate esters, pentaerythritol tetra(meth)acrylates, pentaerythritol tri(meth)acrylates, ethoxylated (3) trimethylolpropane tri(meth)acrylates, ethoxylated (3) trimethylolpropane tri(meth)acrylates, alkoxylated trifunctional (meth)acrylate esters, dipropylene glycol di(meth)acrylates, neopentyl glycol di(meth)acrylates, ethoxylated (4) bisphenol A dimeth(meth)acrylates, tricyclodecanedimethanol di(meth)acrylates, cyclohexane dimethanol di(meth)acrylate esters, isobornyl meth(meth)acrylate, cyclic di(meth)acrylates and tris(2-hydroxy ethyl) isocyanurate tri(meth)acrylate, (meth)acrylates of the foregoing meth(meth)acrylates and meth(meth)acrylates of the foregoing (meth)acrylates. Preferably, the first insulating layer precursor comprises a (meth)acrylate monomer. Note the term "(meth)acrylate" used above with respect to a monomer, oligomer or compound means a vinyl-functional alkyl ester formed as the reaction product of an alcohol with an acrylic or a methacrylic acid.

The first insulating layer 340 can be formed by applying a layer of a monomer or oligomer onto the surface of carrier 350 and crosslinking the layer to form the (co)polymer in situ, e.g., by flash evaporation and vapor deposition of a radiation-crosslinkable monomer, followed by crosslinking using, for example, an electron beam apparatus, UV light source, electrical discharge apparatus or other suitable device. Coating efficiency can be improved by cooling the substrate.

The monomer or oligomer can also be applied to the carrier 350 using conventional coating methods such as roll coating (e.g., gravure roll coating) or spray coating (e.g., electrostatic spray coating), then crosslinked as set out above. The first electrically insulating layer can also be formed by applying a layer containing an oligomer or (co)polymer in solvent and drying the thus-applied layer to remove the solvent. Plasma Enhanced Chemical Vapor Deposition (PECVD) may also be employed in some cases. Alternatively, the first electrically insulating layer is formed by flash evaporation and vapor deposition process followed by crosslinking by one of the methods described above.

Next, the multilayer subunit or tier 310 is formed by depositing the magnetic component layer 320 on top of the first electrically insulating layer 340, where the first electrically insulating layer is supported by a carrier 350 shown in FIG. 4. The magnetic component layer comprising alternating layers of the magnetic material and inorganic insulating material as described previously and can be vapor deposited (represented by reference number 460 in FIG. 4) using a conventional physical vapor deposition process such as a, evaporative deposition process, a sputtering deposition process, or an ablation deposition process where the target is bombarded with a high energy beam (e.g. laser, high energy electrons or cathodic arc) which vaporizes the target material, which subsequently deposits on the work piece. The deposition chamber can be outfitted with two targets, one composed of the magnetic material and one composed of the inorganic insulating material allowing the alternating layers of magnetic material and inorganic insulating material to be formed continuously by simply changing the target being used in a given pass.

Once the surface of magnetic component layer 320 has been built up to the desired number of layers of magnetic material, the roll of multilayer subunit supported on carrier 350 is removed from the deposition chamber. An adhesive layer 370 can then be formed on the exposed surface magnetic component layer. The adhesive can be applied by a spray coating process, solvent coating process, or other conventional continuous adhesive coating process capable of coating thin layers of adhesive. Alternatively, the adhesive layer can be formed by lamination of a film adhesive to the exposed surface of the surface magnetic component layer. The adhesive layer can have a thickness of about 0.1 µm to about 10 µm, preferably about 0.8 µm to about 3 µm.

Thin adhesive layers can be made by coating techniques including liquid coating and vapor coating. Suitable liquid coating methods include solution or solvent based coating, e.g. gravure, roll, or die coating, ink jet coating, and transfer coating. The liquid coating compositions can include monomer, oligomer, or polymer materials. Exemplary vapor coating methods include monomer vaporization, condensation, and curing as described in U.S. Pat. Nos. 4,842,893 and 6,045,864, incorporated herein by reference. The vapor coating compositions can include monomer or oligomer materials.

Exemplary adhesives useable in the present invention include epoxy adhesives, phenolic adhesives, urethane adhesives, acrylic adhesives, water and solvent-based acrylic adhesives, anaerobic acrylic adhesives, cyanoacrylate adhesives, silicone adhesives, polysulfide adhesives, elastomeric adhesives, polyimide adhesives, polyphenylquinoxaline adhesives, polybenzimidazole adhesives, polybutyl elastomer adhesives, polyvinyl acetate adhesives, fluorocarbon adhesives, and polyether silicone adhesives. The adhesives may be coated directly onto the surface of the magnetic component layer, or can be in the form or a tape or a film adhesive which is laminated onto the surface of the magnetic component layer.

As with the previous embodiment, the carrier 350 will be stripped away as the exemplary magnetic multilayer sheet is formed. Thus, it is important to balance the adhesion of the first electrically insulating layer 340 to the carrier layer. The adhesion of the first electrically insulating layer to the carrier should be sufficient enable deposition of the magnetic component layer, but should be low enough to allow clean removal of the carrier layer during the formation of the magnetic multilayer material.

The adhesive coated multilayer subunit material can then be built into the exemplary magnetic multilayer material by lamination of a plurality of multilayer subunits together. This can be done in a piecewise sheet process or the laminate can be formed by a semi-continuous process as described previously. For example a layer of the adhesive coated multilayer subunit material or a non-adhesive coated multilayer subunit material can be disposed on the wrapped around the collection drum 220 (FIG. 3B) with the adhesive layer exposed. The second and successive layers can be formed by laminating the adhesive coated multilayer subunit material onto the previous layer and stripping away carrier 350 before the next layer is applied.

Once the laminate has the desired number of layers have been wound onto the collection drum 220, at least one cut 270 is made through the collected material which can then be removed from the collection drum. The collected material can then be laid flat to yield a sheet of exemplary magnetic material 100 that can be converted into the desired size and shapes for use in PCBs, inductor cores etc.

Figure 5A:
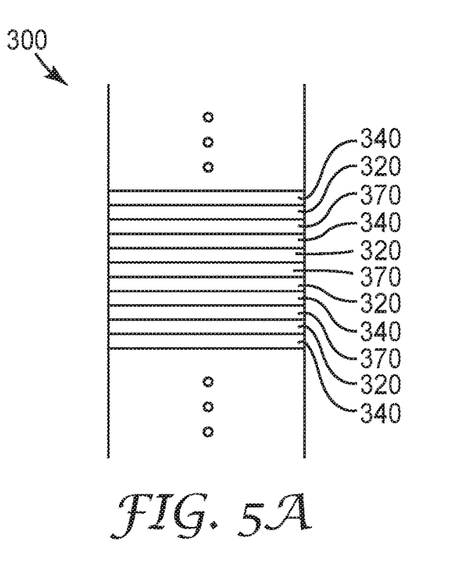
FIGS. 5A and 5B are two schematic views of magnetic materials produced by the process shown in FIG. 4.
Figure 5B:
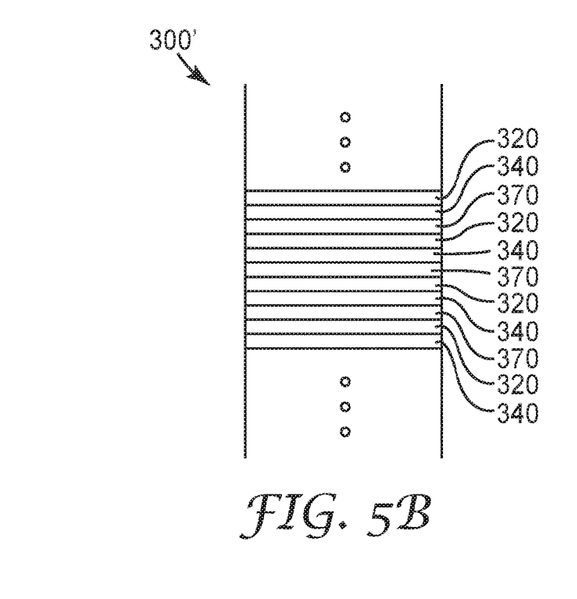

FIGS. 5A and 5B are schematic representations of exemplary multilayer magnetic materials comprising a plurality of first electrically insulating layers, magnetic component layers and adhesive layers.

EXAMPLES

Materials

| | |
|---|---|
| 1.4 μm thick Polyester (PET) substrate on a biaxially oriented polypropylene (BOPP) carrier | Tekra (New Berlin, WI) |
| 2.5 μm CP1 Polyimide on a 50 μm PET carrier | NeXolve Corporation (Huntsville, AL) |
| 5 μm CP1 Polyimide on a 50 μm PET carrier | NeXolve Corporation (Huntsville, AL) |
| Methyl ethyl keytone (MEK, >99.0%) | Sigma-Aldrich (St. Louis, MO) |
| 3M Scotch double sided tape | 3M Company (St. Paul, MN) |
| Permalloy target | Plasmaterials, Inc. (Livermore, CA) |
| Aluminum oxide target | Plasmaterials, Inc. (Livermore, CA) |
| Cobalt/niobium (74.4 wt. %/24.6 wt. %) alloy target | ACI Alloys, Inc. (San Jose, CA) |
| Halfium oxide target | AJA International (Scituate, MA) |

Example 1

A first exemplary multilayer subunit material was prepared using a CHA roll to roll coater (Mark 50, CHA Industries, Inc., Fremont, Calif.) to deposit magnetic component layer onto the first electrically insulating layer. The base pressure was $1\times10^{-6}$ Torr. Layers of NiFe and AlOx were deposited at deposition rates of 120 Å/s and 20 Å/s, respectively. Evaporation materials were acquired from Plasmaterials, Inc. (Livermore, Calif.). The magnetic component layer comprised 5 pairs of alternating 100 nm Permalloy magnetic sublayers and 16 nm aluminum oxide layers for the inorganic insulating sublayer onto a 1.4 μm thick PET substrate with a biaxially oriented polypropylene (BOPP) carrier.

Static magnetic properties were characterized with a Vibrating Sample Magnetometer (VSM, Lakeshore 7307). Coercivity was found to be about 2.5 Oe and 1.5 Oe in transverse direction and machine direction, respectively, implying that the film is magnetically soft and hysteresis loss would be low even at high excitation.

The permeability spectrum at low excitation was measured from 50 MHz to 2 GHz with a coaxial measurement fixture (Damaskos, Inc.). At low frequency, the real part of the relative permeability is about 560, thus, it is reasonable to assume that μ is at least 560 in the range of 1 to 50 MHz. The imaginary part of the permeability μ decreases to minimum at lower frequencies, implying low eddy current loss.

Thus, this material may serve as the basis for a low core loss material, with thicker samples.

Example 2

A second exemplary multilayer subunit material was prepared using a CHA roll to roll coater (Mark 50, CHA Industries, Inc., Fremont, Calif.) to deposit magnetic component layer onto the first electrically insulating layer. The base pressure was $1\times10^{-6}$ Torr. Layers of NiFe and AlOx were deposited at deposition rates of 120 Å/s and 20 Å/s, respectively. Evaporation materials were acquired from Plasmaterials, Inc. (Livermore, Calif.). The magnetic component layer comprised 10 pairs of alternating 100 nm Permalloy magnetic sublayers and 16 nm aluminum oxide layers for the inorganic insulating sublayer onto a 5 μm CP1 Polyimide (i.e. the first electrically insulating layer) on a 50 μm PET carrier. This multilayer subunit material is denoted as $[Ni_{80}FE_{20}(100\ nm)/AlO_x(16\ nm)]_{10}$.

Example 3

A third exemplary multilayer subunit material was prepared using a CHA roll to roll coater (Mark 50, CHA Industries, Inc., Fremont, Calif.) to deposit the magnetic component layer onto the first electrically insulating layer. The base pressure was $1\times10^{-6}$ Torr. Layers of NiFe and AlOx were deposited at deposition rates of 120 Å/s and 20 Å/s, respectively. Evaporation materials were acquired from Plasmaterials, Inc. (Livermore, Calif.). The magnetic component layer comprised 10 pairs of alternating 100 nm Permalloy magnetic sublayers and 16 nm aluminum oxide layers for the inorganic insulating sublayer onto a 2.5 μm CP1 Polyimide (i.e. the first electrically insulating layer) on a 50 μm PET carrier. This multilayer subunit material is denoted as $[Ni_{80}FE_{20}(100\ nm)/AlO_x(16\ nm)]_{10}$.

Example 4

A laminate was formed of 25 layers of $[Ni_{80}FE_{20}(100\ nm)/AlO_x(16\ nm)]_{10}$ on 5 μm CP1 polyimide and 22 layers of $[Ni_{80}FE_{20}(100\ nm)/AlO_x(16\ nm)]_{10}$ on 2.5 μm CP1 polyimide using a piece of double sided tape. Each sample was cut into individual sheets.

The PET carrier was removed from a first sheet of the exemplary multilayer subunit material layer to expose the CPI polyimide. MEK was applied to the exposed CP1 polyimide surface of the first sheet of multilayer subunit material to tackify the polyimide surface. The magnetic component layer of second sheet of multilayer subunit material was disposed on top of the tackified polyimide and pressure was applied to create an intermediate material composed of two stacked multilayer subunit layers. The process was repeated until the exemplary magnetic material was composed of 47 multilayer subunit layers. The total thickness, T, of the resulting material is 346 μm including air trapped inside. About 50 μm thick double side tape was used to stick the two parts together, which increase the sample thickness to 396 μm. The total thickness of Permalloy in the laminate is the sum of the 47 multilayer subunit layers thicknesses, yielding a magnetic content of about 12%.

The static magnetic property was tested with a Vibrating Sample Magnetometer (VSM, Lakeshore 7307). The coercivity of the sample was found to be about 1 Oe, implying that the material is magnetically soft and the hysteresis curve (not shown) for the material suggests low hysteresis loss even at high excitations.

The permeability spectrum at low excitation was measured from 50 MHz to 3 GHz with a coax measurement fixture (Damaskos Inc.). At low frequency, real part of the permeability is about 65, thus, it is reasonable to assume that μ is at least 65 in the range of 1 to 50 MHz. The imaginary part of the permeability μ decreases to minimum at lower frequency, implying low eddy current loss.

Core loss measurements were performed using a test method described in "New core loss measurement method for high-frequency magnetic materials", M. Mu, et. al., pp 4374, *IEEE Transactions on Power Electronics*, Vol. 29, No. 8, (2014). The exemplary magnetic material has a core loss density of 23000 kW/m$^3$ at 20 MHz with maximum magnetic induction of 20 mT. At 40 MHz the core loss density is 60000 kW/m$^3$ with maximum magnetic induction of 20 mT.

Example 5

A third exemplary multilayer subunit material was prepared using an AJA sputtering coater (AJA International Inc. (Scituate, Mass.)) to deposit the magnetic component layer onto a 2.5 μm CP1 polyimide (i.e. the first electrically insulating layer) disposed on a 50 μm PET carrier. The base pressure was 1×10$^{-7}$ Torr. Alternating layers of HfO$_2$ and CoNb were deposited at deposition rates of 0.6 Å/s and 1.6 Å/s, respectively. The magnetic component layer comprised 40 pairs of alternating 50 nm CoNb magnetic sublayers and 3 nm hafnium oxide layers for the inorganic insulating sublayer. This multilayer subunit material is denoted as [CoNb(50 nm)/HfO$_2$(3 nm)]$_{40}$.

An exemplary magnetic multilayer sheet was formed by laminating 20 layers of [CoNb(50 nm)/HfO$_2$(3 nm)]$_{40}$ on 2.5 μm CP1 polyimide. The PET carrier was removed from a first sheet of the exemplary multilayer subunit material layer to expose CPI polyimide. MEK was applied to the exposed CP1 polyimide surface of the first sheet of multilayer subunit material to tackify the polyimide. The magnetic component layer of second sheet of multilayer subunit material was disposed on top of the tackified polyimide and pressure was applied to create an intermediate material composed of two stacked multilayer subunit layers. The process was repeated until the exemplary magnetic material was composed of 20 multilayer subunit layers. The total thickness, T, of the resulting material is about 200 μm including air trapped inside. The total thickness of CoNb in the laminate is the sum of the 20 multilayer subunit layers thicknesses, yielding a magnetic content of about 20%.

The coercivity of the sample was found to be about 1.6 Oe, implying that the material is magnetically soft and the hysteresis curve (not shown) for the material suggests low hysteresis loss even at high excitations. The permeability spectrum at low excitation was measured from 50 MHz to 3 GHz with a coax measurement fixture (Damaskos Inc.). The real part of the permeability μ' was found to be about 50 between 50 MHz and 200 MHz, thus, it is reasonable to assume that μ is at least 50 in the range of 1 to 50 MHz. The imaginary part of the permeability μ" decreases to minimum at lower frequency, implying low eddy current loss, and μ" remain low until 100 MHz. Core loss measurements were performed and the material was found to have a core loss density of 22000 kW/m3 at 20 MHz with maximum magnetic induction of 20 mT. At 40 MHz the core loss density is 55000 kW/m3 with maximum magnetic induction of 20 mT.

The exemplary magnetic material described in the present disclosure is a multilayer structure formed by lamination of a plurality of multilayer subunits together to produce a flexible planar magnetic sheet.

Although specific embodiments have been illustrated and described herein for purposes of description of the preferred embodiment, it will be appreciated by those of ordinary skill in the art that a wide variety of alternate or equivalent implementations may be substituted for the specific embodiments shown and described without departing from the scope of the present invention. Those with skill in the art will readily appreciate that the present invention may be implemented in a very wide variety of embodiments. This application is intended to cover any adaptations or variations of the embodiments discussed herein.

What is claimed is:

1. A sheet of magnetic material having a multilayer structure, the multilayer structure comprising:
   a plurality of stacked magnetic component layers separated by first electrically insulating layers,
   wherein each of the plurality of magnetic component layers comprises a plurality of isolated magnetic sublayers and inorganic insulating layers disposed between each of the isolated magnetic sublayers, wherein the plurality of isolated magnetic sublayers are substantially planar and parallel and each of the isolated magnetic sublayers has a magnetic layer thickness that is less than one micron, and wherein each of the first electrically insulating layers has a first insulating layer thickness of between about 0.5 microns and about 20 microns and each inorganic insulating layer has an insulating sublayer thickness of less than about 200 nm, and
   where the magnetic material sheet has a magnetic fraction between about 5% and about 80%; a total magnetic thickness of greater than or equal to 5 microns; and a relative composite permeability of greater than about 20.

2. The sheet of claim 1, wherein each of the isolated magnetic sublayers comprises at least one of a single magnetic metal element, and a magnetic alloy.

3. The sheet of claim 1, wherein each of the isolated magnetic sublayers comprises at least one of elemental iron, elemental nickel, elemental cobalt, a nickel-cobalt alloy, a nickel-iron alloy, an iron-cobalt alloy, an iron-cobalt-nickel alloy, an iron-cobalt-boron alloy, and a cobalt-niobium alloy.

4. The sheet of claim 1, wherein the magnetic material has a magnetic content between 10% and 80%.

5. The sheet of claim 1, wherein the magnetic material has a coercivity of less than 50 Oe.

6. The sheet of claim 1, wherein each of the magnetic component layers is between about 0.5 microns and about 5 microns thick.

7. The sheet of claim 1, wherein each of the isolated magnetic sublayers has a magnetic layer thickness between about 15 nm and about 1000 nm.

8. The sheet of claim 1, wherein the magnetic material comprises a plurality of tiers, wherein each tier comprises one of the magnetic component layers and one of the first electrically insulating layers.

9. The sheet of claim 1, wherein the magnetic material has a core loss density less than about 40000 kW/m$^3$ at 20 MHz at maximum excitation of 20 mT.

10. The sheet of claim 1, wherein the first electrical insulating layers comprise polymeric insulating layers.

11. The sheet of claim 10, wherein the polymeric insulating layers are formed from one of a polyester, a polyimide, a polyethylene naphthalate, a polypropylene and a polyethylene.

12. The sheet of claim 1, wherein the inorganic insulating layer comprises one of an inorganic oxide layer, an inorganic fluoride layer, and an inorganic nitride layer.

13. The sheet of claim 1, wherein the inorganic oxide layer comprises at least one of aluminum oxide, silicon monoxide, silicon dioxide, zirconium oxide, hafnium oxide and chromium(III) oxide.

14. The sheet of claim 1, wherein the inorganic nitride layers comprise silicon nitride.

15. The sheet of claim 1, wherein the inorganic fluoride layers comprise magnesium fluoride.

16. A sheet of magnetic material having a multilayer structure, the multilayer structure comprising:
- a plurality of stacked magnetic component layers separated by first electrically insulating layers, wherein the first electrically insulating layers have a first insulating layer thickness of between about 0.5 microns and about 20 microns and comprise a polymeric material,
- wherein each of the plurality of magnetic component layers comprises a plurality of isolated magnetic sublayers and inorganic insulating layers disposed in alternating thin layers on one of the first electrically insulating layers, wherein the plurality of isolated magnetic sublayers are substantially planar and parallel and each of the isolated magnetic sublayers has a magnetic layer thickness that is less than one micron and wherein each inorganic insulating layer has an insulating sublayer thickness of less than about 200 nm, and
- where the magnetic material sheet has a magnetic fraction between about 5% and about 80%; a total magnetic thickness of greater than or equal to 5 microns; and a relative composite permeability of greater than about 20.

17. A sheet of magnetic material having a multilayer structure, the multilayer structure comprising:
- a plurality of stacked magnetic component layers separated by first electrically insulating layers, wherein the first electrically insulating layers have a first insulating layer thickness of between about 0.5 microns and about 20 microns and comprise a polymeric material,
- wherein each of the plurality of magnetic component layers comprises a plurality of isolated magnetic sublayers formed from a material consisting of a magnetic alloy and inorganic insulating layers disposed in alternating thin layers on each first electrically insulating layer, wherein the plurality of isolated magnetic sublayers are substantially planar and parallel and each of the isolated magnetic sublayers has a magnetic layer thickness that is less than one micron and wherein each inorganic insulating layer has an insulating sublayer thickness of less than about 200 nm, and
- where the magnetic material sheet has a magnetic fraction between about 5% and about 80%; a total magnetic thickness of greater than or equal to 5 microns; and a relative composite permeability of greater than about 20.

* * * * *

UNITED STATES PATENT AND TRADEMARK OFFICE
CERTIFICATE OF CORRECTION

PATENT NO. : 10,658,096 B2
APPLICATION NO. : 16/077496
DATED : May 19, 2020
INVENTOR(S) : Xiaoming Kou et al.

It is certified that error appears in the above-identified patent and that said Letters Patent is hereby corrected as shown below:

In the Specification

Column 9,
Line 56, after "permeability" insert -- µ' --.
Line 58, delete "µ" and insert -- µ" -- therefor.

Signed and Sealed this
Fifteenth Day of December, 2020

Andrei Iancu
*Director of the United States Patent and Trademark Office*